June 17, 1924.
W. E. McCUNE
TIRE
Filed Sept. 4, 1919
1,498,051
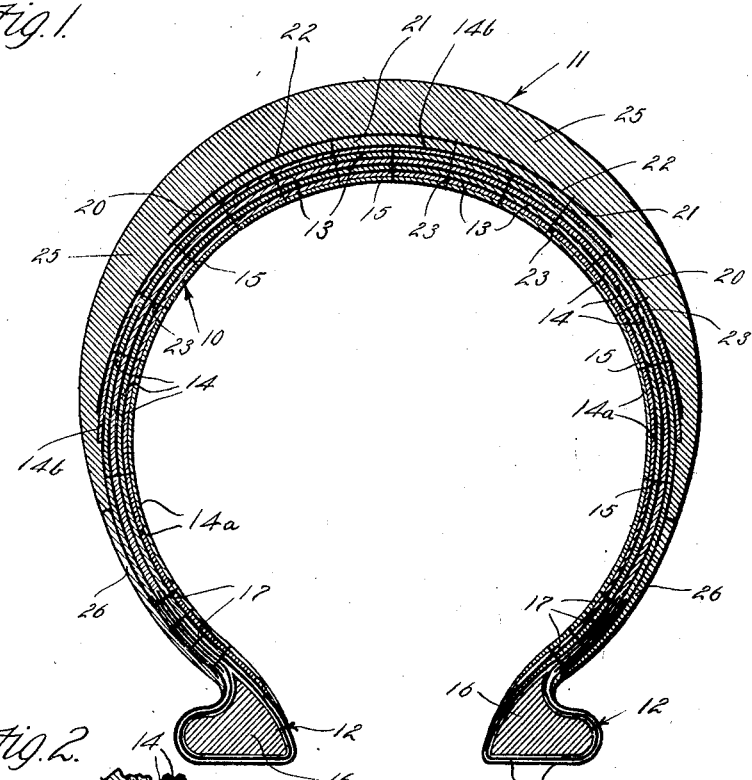
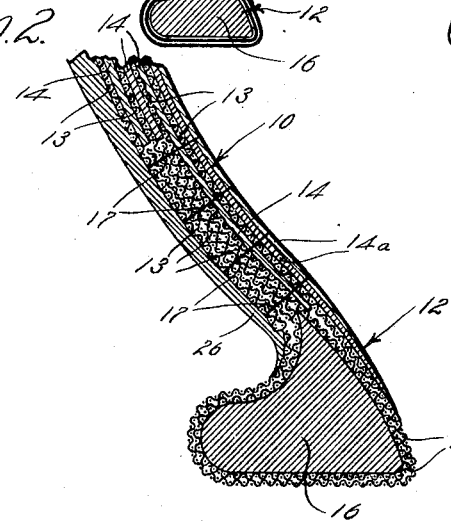
Inventor
William E. McCune
by
James T. Batchelor
his Attorney Patented June 17, 1924.

1,498,051

UNITED STATES PATENT OFFICE.

WILLIAM E. McCUNE, OF LOS ANGELES, CALIFORNIA, ASSIGNOR, BY DIRECT AND MESNE ASSIGNMENTS, OF ONE-HALF TO R. P. CONGDON, OF LOS ANGELES, CALIFORNIA.

TIRE.

Application filed September 4, 1919. Serial No. 321,519.

*To all whom it may concern:*

Be it known that I, WILLIAM E. McCUNE, a citizen of the United States, residing at Los Angeles, in the county of Los Angeles, State of California, have invented new and useful Improvements in Tires, of which the following is a specification.

This invention relates to tire casings and particularly to pneumatic tire casings. It is an object of the invention to provide a pneumatic tire casing which is simple in construction, durable, and inexpensive to manufacture.

The body or carcass of an ordinary tire casing is constructed of fabric and rubber. A carcass generally comprises several sheets of "frictioned" fabric vulcanized or cured together. The frictioning of the fabric comprises the forcing or embedding of a rubber composition into the mesh of the fabric by calendering or squeezing the rubber composition and the fabric between hot rolls. The frictioning of the fabric greatly decreases its strength and causes it to deteriorate very rapidly. The heat necessary for the process of frictioning dries out the rubber and the fabric while the rubber being embedded in the fabric causes it to decay or rot. A carcass built up out of frictioned fabrics is considerably harder and stiffer than is necessary for the successful operation of the casing and is more or less brittle. The present invention provides a casing which not only overcomes the disadvantages of ordinary casings but also possesses other new and desirable features.

The present invention provides a carcass construction which is more or less soft or flexible and is at the same time strong and durable. The construction of the carcass requires no materials or processes which affect or act deterioratingly upon the fabrics in any way; no heat is used or necessary during the construction of the carcass and no compositions or materials are embedded into the mesh of the fabrics. The carcass provided by the invention is firmly and securely held in shape without the use of cement, or the like, of any kind.

The carcass provided by the invention comprises sheets of fabric separated by cushioning material sheets of (felt) and is held in shape by stitching. The fabric in the carcass is not in any way injured or destroyed during the process of construction and the cushioning material is such that the fabric is not injured by it during or after the process of construction. The cushioning material being between the sheets of fabric without being embedded in them allows the flexibility of the fabric which can not be obtained if the mesh of the fabric is filled with rubber or the like.

A further feature of the invention is the simplicity and inexpensiveness of the casing; the casing due to the fact that it requires no heat treatment, etc., can be quickly and easily constructed and does not require complicated or expensive machinery.

Further objects and features of the invention will be readily understood from the following detailed description of a preferred embodiment of the invention throughout which reference is had to the accompanying drawings in which—

Fig. 1 is a sectional view of a pneumatic tire casing embodying the invention; and Fig. 2 is an enlarged view of a portion of the casing shown in Fig. 1.

Throughout the drawings numeral 10 designates the carcass of the casing on which is carried the tread 11. For purposes of illustration I have shown my invention as applied to an ordinary type of pneumatic tire casing, that is, a casing being provided with beads 12 adapted to fit a clincher rim.

The carcass 10 of the casing comprises sheets of fabric 13 between which are sheets of felt 14. In the particular construction shown in the drawings there are four fabric 13 and three sheets of felt 14. There are also two sheets of felt $14^a$ on the inside of the carcass and a sheet of felt $14^b$ on the outside of the carcass. It will be readily understood that the invention is not limited to such a number or arrangement of sheets of felt and fabric but that any number of such sheets may be employed. The fabric used in the carcass construction is preferably ordinary Sea Island, Egyptian or similar cotton fabric and the felt may be ordinary commercial felt. The sheets of fabric and felt when assembled are preferably drawn and bound together by radial stitching or ties 15. The stitching 15 preferably runs longitudinally around the carcass and is spaced approximately as shown in the drawings, although it will be understood that the stitching can run in any desired direction and it may be close together or as far apart as desired. It will be further understood that the invention is not limited to the carcass being stitched together in this manner as it is very apparent that many other kinds of radial ties or the like could be advantageously used. The double layer of felt sheets on the inside of the carcass provides a more or less soft surface to be engaged by the inner tube and also allows the stitching used in the construction to embed itself in the felt and not be at the inner surface of the carcass so as to engage the inner tube.

It will be seen that the carcass body thus described, comprises a plurality of alternating layers or sheets of fabric and cushioning material. These are preferably endless, extending completely around the length of the tire. The stitching or ties bind these layers closely together, the layers being drawn together by the stitching or tying. The sheets of fabric are preferably laid with warp and woof, respectively, longitudinally of and at right angles to the length of the carcass.

The beads 12 may be formed on the carcass in any suitable manner. For instance, the two innermost sheets of fabric 13 may extend around the bead fillers 16 and extend upwardly between the outer fabric sheets which are somewhat shorter than the inner ones, as clearly shown in the drawings. The overlapping ends of the inner and the outer fabric sheets can be bound or held together by stitching 17 similar to the stitching 15 which binds the sheets of felt and the fabric together. In the particular casing shown in the drawings the felt between the two innermost sheets of fabric and the inner sheets of felt extend to the beads 12 while the other sheets of felt between the fabrics extend to the ends of the two innermost sheets of fabric, which are between the outer fabric sheets, and the outer felt sheets extends a little more than one-half way around the carcass as clearly shown in the drawings. If it is so desired the portions of the inner sheets of fabric, where they engage the bead fillers 16, may be frictioned and may be cured to the bead fillers 16 without materially weakening or affecting the carcass.

The tread 11 may be of any desired construction and may be attached to the carcass in any desired manner although I prefer to use a tread construction comprising a sheet of frictioned fabric, cushion, a breaker strip and a tread, cured or vulcanized onto the outer surface or felt sheet of the carcass. I preferably arrange a strip of frictioned fabric 20 over the outer felt layer of the carcass, place cushion stock (rubber) 21 on the frictioned fabric and then place a breaker strip 22 (or breaker strips if so desired) over the cushion stock. I preferably attach or secure the strip of frictioned fabric, the cushion stock and the breaker strip 22 to the carcass by stitching 23. The stitching 23 may be in any desired direction and may be spaced any desired distance apart although I prefer to arrange the stitching 23 parallel to, and between, the stitching 15. When the frictioned strip of fabric, the cushion stock and the breaker strip have thus been suitably stitched to the carcass I place the carcass in a mold and cure a suitable rubber tread 25 onto the carcass. The curing of the tread 25 to the carcass causes the frictioned strip 20 to be cured to the outer felt. Suitable side walls 26 may be cured onto the casing in the usual manner. Although it is necessary to subject the casing to heat in order to cure the tread to the carcass, the fabrics of the carcass are not materially affected by the heat as the felts and fabric are poor heat conductors.

A casing constructed in the manner hereinabove set forth is not only durable, strong and inexpensive to manufacture, but is also more resilient and lighter than an ordinary casing. The carcass being built up of sheets of fabric and intervening layers of flexible and cushioning felt is more resilient and much lighter than a carcass built up of fabric and rubber. The resiliency of the carcass adds to the ultimate resiliency of the tire and thereby adds to the shock breaking quality of the tire. It also adds to the life of the tire, as the fabric sheets are relatively free to flex without breaking.

One of the characteristics of felt or other cushioning material I use is its non-heat conductivity. This characteristic protects the inner tube from over-heating; and this characteristic may be attained also by using an asbestos material—an asbestos felt or the like.

Throughout the above description I have referred to fabric and felt as being the materials out of which the carcass is constructed; it will be understood, however, that the invention is not limited to any particular kind or grade of fabric and is not limited to any particular kind of cushion material such as felt. When I refer to felt I do not limit myself to the specific material commercially known as felt but include various materials which possess the general characteristics of felt—that is materials which are flexible, cushioning, etc.

Having described a preferred embodiment of my invention I do not wish to limit myself to the specific details hereinabove set forth but wish to reserve to myself any changes or modifications that may appear to those skilled in the art and fall within the scope of the following claims.

Having described a preferred form of my invention, I claim:

1. A tire casing comprising a carcass embodying sheets of fabric separated by felt, the felt and the fabrics being stitched together, and a tread construction mounted on the carcass, the tread construction comprising a sheet of frictioned fabric, a strip of cushion stock, a breaker strip, and a tread cured together and to the carcass, the frictioned fabric, the cushion stock and the breaker strip being stitched to the carcass.

2. A tire casing comprising, beads, a carcass extending substantially from bead to bead and including a plurality of sheets of fabric separated by sheets of felt, and a tread carried by the carcass.

3. A tire casing comprising a plurality of sheets of fabric separated by sheets of felt and all secured together, the sheets of fabric extending around the beads of the casing and the sheets of felt extending from bead to bead over the tread portion.

4. A tire casing embodying a carcass including a plurality of alternately superposed sheets of fabric and of felt secured together, and a tread carried by the carcass.

5. A tire casing embodying, a carcass including, a plurality of sheets of fabric, and sheets of felt between the sheets of fabric.

6. A tire casing embodying a carcass including a plurality of alternately superposed sheets of fabric and of felt stitched together, and a tread carried by the carcass and including a strip of fabric stitched to the carcass.

7. A tire casing including, beads, and a plurality of sheets of fabric extending between and secured to the beads, and sheets of felt between the sheets of fabric and extending substantially from bead to bead.

8. A tire casing including, beads, and a carcass including superposed layers of fabric and felt, the edge portions of the fabric being wrapped completely around the beads.

In witness that I claim the foregoing I have hereunto subscribed my name this 27th day of August, 1919.

WILLIAM E. McCUNE.

Witness:
VIRGINIA I. BERINGER.